July 12, 1927.

H. C. HARRIS 1,635,669

VEHICLE ANTIFRICTION SPRING BEARING

Filed Aug. 27, 1925

INVENTOR
Howard C. Harris
BY
Mitchell Bechet
ATTORNEYS.

Patented July 12, 1927.

1,635,669

UNITED STATES PATENT OFFICE.

HOWARD C. HARRIS, OF AKRON, OHIO, ASSIGNOR TO THE FAFNIR BEARING COMPANY, OF NEW BRITAIN, CONNECTICUT, A CORPORATION OF CONNECTICUT.

VEHICLE ANTIFRICTION SPRING BEARING.

Original application filed December 1, 1924, Serial No. 753,197. Divided and this application filed August 27, 1925. Serial No. 52,747.

My invention relates to an anti-friction vehicle spring bearing.

This application is a division of my co-pending application, Serial No. 753,197, filed December 1, 1924.

It is an object of the invention to provide an improved form of anti-friction vehicle spring bearing, particularly adapted for the horn end, and one which will be simple in construction, not likely to get out of order, and which will compare favorably in cost with an ordinary plain bearing.

In the drawings which show, for illustrative purposes only, a preferred form of the invention—

Figure 1:
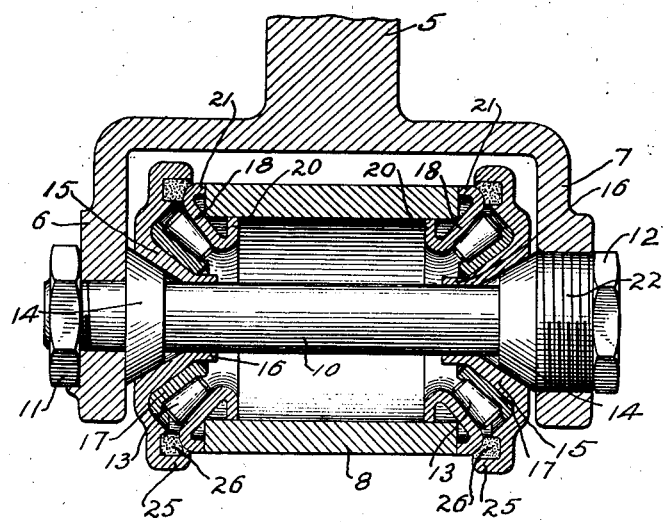
Fig. 1 is an end view in section of one end of a vehicle frame and spring, and illustrating features of the invention.
Figure 2:
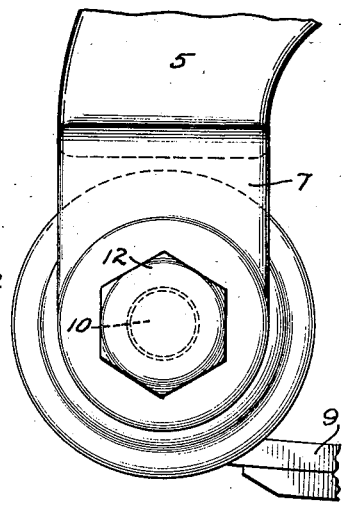
Fig. 2 is a fragmentary view in side elevation of parts shown in Fig. 1.

In said drawings, 5 indicates part of a vehicle frame, such as the horn end thereof, and which may be formed into a yoke having arms 6—7, between which the eye 8 on the vehicle spring 9 may be positioned. In the ordinary hinge connection the spring eye is provided with a bushing, and a pin is journaled in this bushing and secured to the arms 6—7. Such bushing and pins are subjected to heavy stresses and wear rapidly, and lubrication thereof is exceedingly difficult. By my invention I am enabled to provide an efficient type of anti-friction bearing, whereby wear is reduced to a minimum and lubrication is rendered necessary only at long intervals.

The arms 6—7 are provided with aligned bores and a bolt or pin member 10 is rigidly secured in the arms, as by means of nuts 11—12. Anti-friction bearing members, for example, tapered rollers 13—13, are interposed between the bolt 10 and the spring eye. In order to provide a proper bearing for the anti-friction bearing members 13, I preferably form on or place on the pin conical supporting rings or washers 14—14, and on these washers bearing rings 15—15 are supported, which, if desired, may be formed of sheet metal. In the form shown these bearing rings have axially extending flanges 16—16, which may fit the pin 10 quite closely, and outwardly of these flanges the rings are formed to seat upon the conical rings or washers 14—14. If desired, hardened steel, wear-resisting race rings 17—17 may be placed on the bearing rings 15—15.

Outer bearing rings 18—18 are held in the spring eyes. In the form shown these rings 18—18 are formed of sheet metal and have a relatively large bearing surface for the anti-friction members 13—13 and have a radially extending flange 20 at the inner end for abutting the inner circumference of the spring eye, and an axially extending flange 21 at the opposite end for abutting the edge of the spring eye. The outer rings 18—18 are thus securely held against both axial and radial displacement on the spring eye.

At one end the bolt 10 may be passed through or have formed thereon a screw plug 22, so that, upon turning up on the plug 22, the two washers 14—14 may be moved toward each other for adjustment of the bearing seats on the anti-friction bearing members 13—13. By this or a similar provision any wear on the anti-friction bearing members or their seats may be easily taken up.

In order to exclude dust from the bearing surfaces and to retain lubricant, I preferably form an inwardly directed flange 25 on each bearing ring 15, which flanges extend up to and over the sides of the outer rings 18—18. Felt washers 26—26 may be interposed between the rings 15 and 18, so as to form a sealed construction for preventing the entry of dirt, dust and water to the bearing surfaces.

It will thus be seen that I have provided an anti-friction bearing connection between a vehicle spring and frame which is of rugged construction, relatively simple and cheap to manufacture, and which may be readily adjusted to secure an accurate and proper fit between the anti-friction bearing members and their seats. The stresses between the spring and frame are borne by the anti-friction bearing members, and wear will be very slight.

The bearing surfaces will be effectively protected against the entry of dust and water into the bearing, and heavy lubricant within the bearing will be held therein.

While the invention has been described in great detail, I do not wish to be strictly limited to the form shown, since changes may be made within the scope of the invention as defined in the appended claims.

I claim:

1. In a device of the character described, a frame member, a spring having an eye thereon, a connection between said spring and frame including a bolt carried by said frame member, outer race members for anti-friction bearings carried by said spring eye at the opposite ends thereof and each comprising a pressed metal ring having a radially extending flange at one end, the periphery of which fits the interior of said eye, an axially extending flange at its other end, the end of the latter flange abutting against the end of said eye, inner race members carried by said bolt, and anti-friction bearings members interposed between said inner and outer race members at each side of said eye.

2. In a device of the character described, a frame member, a spring having an eye thereon, a connection between said frame member and spring, including a bolt carried by said frame member, outer race members for anti-friction bearing members carried by said spring eye at the opposite ends thereof and each comprising a pressed metal ring having a radially extending flange at one end, the periphery of which fits the interior of said eye, an axially extending flange at its other end, the end of the latter flange abutting against the end of said eye, inner race members carried by said bolt and having flanges extending toward said outer race members, anti-friction bearing members between the co-operating inner and outer race members, and dust-excluding means arranged between the last mentioned flanges and the adjacent surfaces of said outer race members.

3. In a device of the character described, a frame member, a spring having an eye thereon, a bolt carried by said frame member, outer race members for anti-friction bearing members carried by said spring eye at the opposite ends thereof, and each consisting of a pressed metal ring having a radially extending flange at one end, the periphery of which abuts the interior of said eye, an axially extending flange at its other end, the end of the latter flange abutting against the end of said eye, inner race members carried by said bolt and formed of pressed metal and each of generally conical form with inner and outer axially extending flanges, said inner flange engaging said bolt and said outer flange extending toward the outer end of the adjacent co-operating outer race member, anti-friction bearing members between the co-operating inner and outer race members, and dust-excluding means arranged between said outer flanges and the adjacent surfaces of said outer race members.

4. In a device of the character described, a frame member, a spring having an eye thereon, a bolt carried by said frame member and extending through said spring eye, outer race members for anti-friction bearing members carried by said eye at the opposite ends thereof, oppositely faced conical members on said bolt, pressed metal inner race members of generally conical form having inner and outer axially extending flanges, said inner flanges being seated on said conical members, and said outer flanges each enclosing a portion of the co-operating outer race members, rollers between the co-operating inner and outer race members, and dust-excluding means arranged between said outer flanges and the adjacent surfaces of said outer race members.

5. In a device of the character described, a frame member, a spring having an eye thereon, a bolt carried by said frame member and extending through said eye, outer race members for anti-friction bearing members carried by said eye at the opposite ends thereof, oppositely faced conical members on said bolt, pressed metal inner race members of generally conical form having inner and outer inwardly extending flanges, said inner flanges being seated on said conical members and carrying hardened steel rings on their outer surfaces and said outer flanges each enclosing a portion of the co-operating outer race members, rollers between said rings and the co-operating outer race members, and dust-excluding means arranged between said outer flanges and the adjacent surfaces of said outer race members.

6. In a device of the character described, the combination of two members to be pivotally connected together, said members having aligned eyes, a bolt passing through said eyes and carried by one of the members, anti-friction bearings for mounting the other of said members on said bolt, each of said bearings comprising an inner race member on said bolt, an outer race member mounted in the eye of said other member and formed of pressed metal having radially and axially extending flanges, the radial flange at one end fitting the interior of said eye, the axially extending flange abutting against the end of said eye, the outer surface of said outer race member between said flanges engaging with the inner edge of said eye so as to be supported thereby, and rollers between the co-operating inner and outer race members.

7. In a device of the character described, a vehicle frame having spaced apart arms, a bolt extending between and carried by said arms, a spring having an eye extending between said arms and over said bolt and spaced therefrom, anti-friction bearing members interposed between said bolt and said spring eye at each end thereof, seat members for said antifriction bearing members supported on said bolt and on said spring eye, and means for adjusting the fit of said anti-friction bearing members on said seat members.

8. In a device of the character described, a vehicle frame having spaced apart arms, a vehicle spring having an eye positioned between said spaced apart arms, a bolt secured to said arms and passing through said spring eye, conical supports on said bolt, anti-friction bearing member raceways engaging said supports at opposite sides of said spring eye, an anti-friction bearing member raceway carried by said spring eye at each end thereof, anti-friction bearing members interposed between said raceways on said spring and on said conical supporting members, and means for moving said conical supporting members relatively to each other for adjusting the fit between said anti-friction bearing members and their co-operating raceways.

9. In a device of the character described, a vehicle frame having spaced apart side members, a through bolt carried by and extending between said side members, a spring eye between said side members and surrounding said bolt, anti-friction raceway members carried by said spring eye at opposite sides thereof, co-operating anti-friction raceway members surrounding said bolt, anti-friction bearing members between said raceway members, and means carried by said bolt for adjusting the fit of said raceway members on said anti-friction bearing members.

10. In a device of the character described, a vehicle frame and a vehicle spring, one of said members having spaced apart arms, the other of said members having an eye between said arms, a through bolt carried by and extending between said arms, anti-friction raceway members carried by said eye at opposite sides thereof, co-operating anti-friction raceway members surrounding said bolt and facing said first-mentioned raceway members, anti-friction bearing members fitting between said raceway members, and means for adjusting the fit of said raceway members on said anti-friction bearing members.

HOWARD C. HARRIS.